US008632092B2

(12) United States Patent
Huang

(10) Patent No.: US 8,632,092 B2

(45) Date of Patent: Jan. 21, 2014

(54) ROLLATOR HAVING AN ADJUSTABLE SEAT ORIENTATION

(76) Inventor: Wendy Huang, New Taipei (TW)

( * ) Notice: Subject to any disclaimer, the term of this patent is extended or adjusted under 35 U.S.C. 154(b) by 0 days.

(21) Appl. No.: 13/606,770

(22) Filed: Sep. 7, 2012

(65) Prior Publication Data

US 2013/0062848 A1 Mar. 14, 2013

(30) Foreign Application Priority Data

Sep. 9, 2011 (TW) ............................ 100216986 U

(51) Int. Cl.
*B62B 1/00* (2006.01)

(52) U.S. Cl.
USPC .................. 280/639; 280/87.041; 280/47.34; 280/87.021

(58) Field of Classification Search
USPC ......... 280/33.993, 47.38, 639, 642, 643–644, 280/647–650, 658; 297/195.13, 218.1, 297/218.2, 218.3, 219.12, 440.11
See application file for complete search history.

(56) References Cited

U.S. PATENT DOCUMENTS 808,905 A * 1/1906 Curwen ........................ 297/101
2012/0175855 A1* 7/2012 Lautzenhiser et al. ... 280/47.371

* cited by examiner

*Primary Examiner* — John Walters
*Assistant Examiner* — James Triggs
(74) *Attorney, Agent, or Firm* — SmithAmundsen LLC; Dennis S. Schell

(57) ABSTRACT

A rollator includes a support frame assembly, a seat having first and second positioning notches, and a backrest unit including a backrest frame having two opposite ends pivoted to the support frame assembly, and a positioning frame having two opposite ends pivoted to the backrest frame. The positioning frame is engageable with a selected one of the first and second positioning notches. The backrest frame cooperates with the seat unit to define a seating space that faces rearward when the positioning frame is engaged with the first positioning notch, and cooperates with the seat unit to define a seating space that faces forward when the positioning frame is engaged with the second positioning notch.

13 Claims, 5 Drawing Sheets

ROLLATOR HAVING AN ADJUSTABLE SEAT ORIENTATION

CROSS REFERENCE TO RELATED APPLICATION

This application claims priority of Taiwanese Patent Application No. 100216986, filed on Sep. 9, 2011.

1. Field of the Invention

The invention relates to a wheeled walker, more particularly to a rollator having an adjustable seat orientation.

2. Description of the Related Art

A rollator is a type of walking aid for elderly people or people with mobility problems that functions by reducing the burden carried by a person's lower limbs. Generally, a conventional rollator includes a front support frame extending obliquely rearward relative to a horizontal support surface, a pair of handgrips mounted to top ends of the front support frame, a rear support frame pivotably connected to the front support frame and cooperating with the same to define an included angle therebetween, and a plurality of wheels mounted to bottom ends of the front and rear support frames.

In order to allow a user to sit and rest, a seat unit is usually provided between the front and rear support frames, and a backrest cooperates with the seat unit to define a seating space for the user to sit. The user sits facing opposite a walking direction. That is, when the user is tired, he/she places the rollator in a brake position, and then turns around to sit on the seat unit to rest.

However, since the design of the seating space is fixed, the user must face rearward to sit on the seat unit. Hence, the usability of the conventional rollator is limited.

SUMMARY OF THE INVENTION

Therefore, an object of the present invention is to provide a rollator that, apart from aiding a user to walk and to permit sitting when tired, has an adjustable seat orientation so that the rollator can also be used as a wheelchair.

Accordingly, a rollator of the present invention comprises a support frame assembly, a plurality of spaced-apart wheels mounted on a bottom portion of the support frame assembly, a seat unit, and a backrest unit. The seat unit includes a seat that is mounted on the support frame assembly and that has a first positioning notch formed in a top surface thereof and proximate to a front end thereof, and a second positioning notch formed in the top surface and proximate to a rear end thereof. The backrest unit includes a backrest frame having two opposite ends pivoted to the support frame assembly, and a positioning frame having two opposite ends pivoted to the backrest frame. The positioning frame is engageable with a selected one of the first and second positioning notches. The backrest frame cooperates with the seat unit to define a seating space that faces rearward when the positioning frame is engaged with the first positioning notch, and cooperates with the seat unit to define a seating space that faces forward when the positioning frame is engaged with the second positioning notch.

The effect of this invention resides in that because the positioning frame is engageable with a selected one of the first and second positioning notches, the seating space defined by the seat and the backrest frame may be altered according to the user's requirement. That is, the seating space may face rearward to allow the user to sit when he/she is tired, and may face forward to allow the user to sit while another person pushes the rollator to simulate a wheelchair.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The above-mentioned and other technical contents, features, and effects of this disclosure will be clearly presented from the following detailed description of one embodiment in coordination with the reference drawings.

Figure 1:
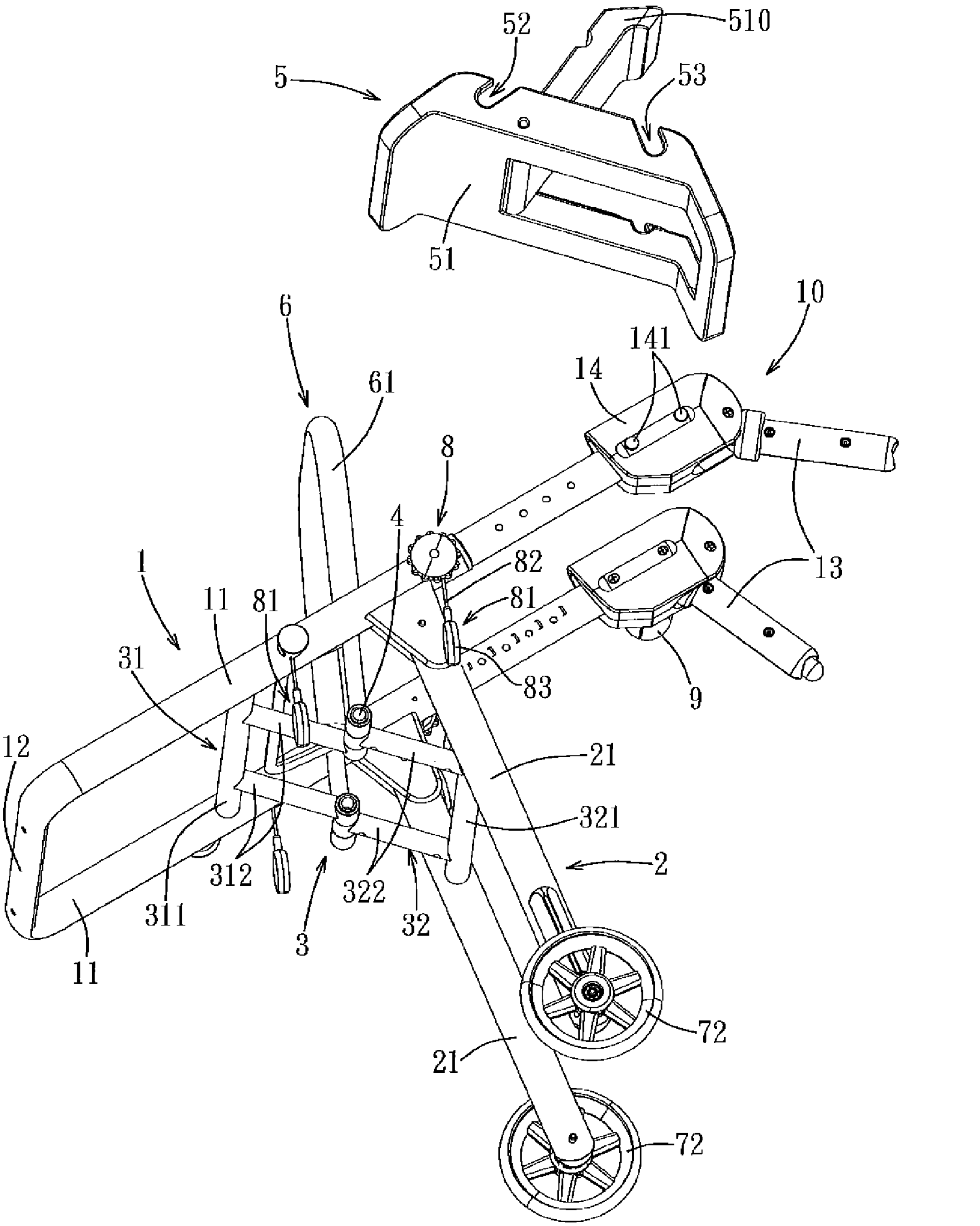
FIG. 1 is a partly exploded perspective view of a rollator according to the preferred embodiment of this invention.
Figure 2:
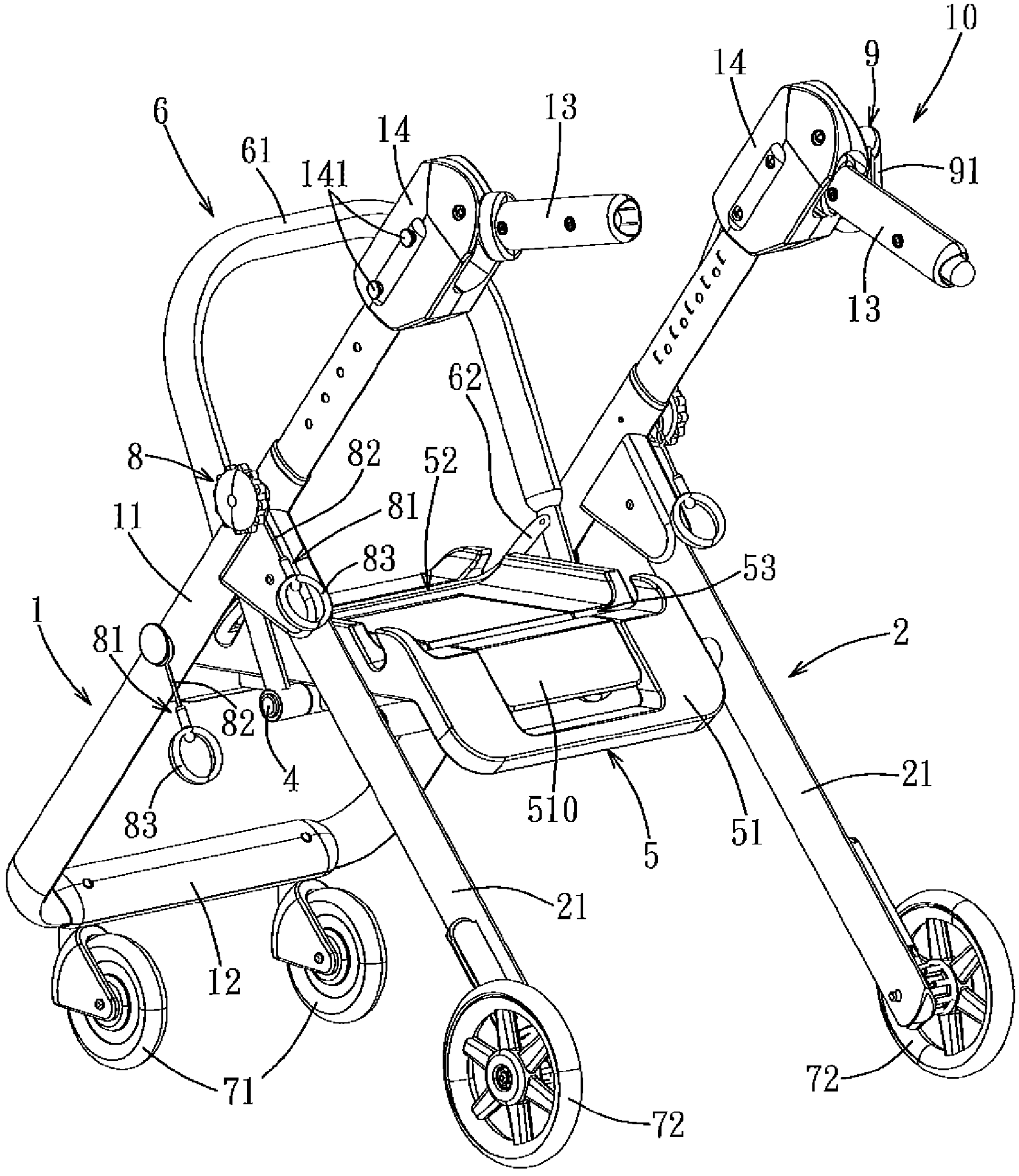
FIG. 2 is a perspective view of the preferred embodiment in an assembled state.

Referring to FIGS. 1 and 2, a rollator according to the preferred embodiment of this invention is shown to comprise a support frame assembly 10, a seat unit 5, a backrest unit 6, two front wheels 71 and two rear wheels 72. The support frame assembly 10 includes a main support frame 1, a rear support frame 2 and an intermediate support frame 3.

In this embodiment, the main support frame 1 is U-shaped, extends obliquely rearward relative to a horizontal support surface, such as a ground, and includes two main support rods 11, a central bight portion 12 connected between bottom ends of the main support rods 11, two handgrips 13 respectively connected to top ends of the main support rods 11, and two cover bodies 14 each covering a pivot junction of one of the main support rods 11 and a respective one of the handgrips 13.

The rear support frame 2 includes two rear support rods 21 each pivoted to a respective main support rod 11 between top and bottom ends thereof. The front wheels 71 are pivotally mounted on the central bight portion 12 in a spaced apart manner. The rear wheels 72 are mounted pivotally and respectively on bottom ends of the rear support rods 21.

The intermediate support frame 3 is mounted below pivot junctions of the main support rods 11 and the rear support rods 21 to mount the seat unit 5 thereto. The intermediate support frame 3 includes a first frame part 31 and a second frame part 32. The first frame part 31 includes a first support rod 311 pivoted between the main support rods 11, and two first connection rods 312 extending transversely from the first support rod 311 and spaced apart in a left-right direction. The second frame part 32 includes a second support rod 321 pivoted between the rear support rods 21, and two second connection rods 322 extending transversely from the second support rod 321 and spaced apart in the left-right direction. A free end of each first connection rod 312 and a free end of a respective second connection rod 322 are pivotally connected to a transverse axle 4.

The seat unit 5 includes a seat 51 having a first positioning notch 52 formed in a top surface thereof and proximate to a front end thereof, and a second positioning notch 53 formed in the top surface thereof and proximate to a rear end thereof. In this embodiment, the seat 51 is a rigid body that is not easily deformed, and is fastened to the second support rod 321 using screws. That is, only the rear end of the seat 51 is fixed. However, it is not limited as such. Only the front end of the seat 51 may be fixed. In this case, the seat 51 is fixed to the first support rod 311. The seat 51 of this embodiment further has a hatch 510 such that a user could lift the hatch 510 to gain entrance to a basket (not shown) placed underneath the intermediate support frame 3.

The first positioning notch 52 is inclined rearward relative to the top surface of the seat 51 at an angle of about 45°, and the second positioning notch 53 is inclined forward relative to the top surface of the seat 51 at an angle of about 45°. Each of the first and second positioning notches 52, 53 extends through left and right sides of the seat 51.

The backrest unit 6 includes a deep U-shaped backrest frame 61 and a shallow U-shaped positioning frame 62. The backrest frame 61 has a downward opening and has two opposite ends pivoted to the transverse axles 4. As such, the backrest frame 61, the first frame part 31 and the second frame part 32 are all pivoted to the transverse axles 4. The positioning frame 62 has an upward opening and has two opposite ends pivoted to two opposite arms of the backrest frame 61 in proximity to bottom ends thereof.

Figure 3:
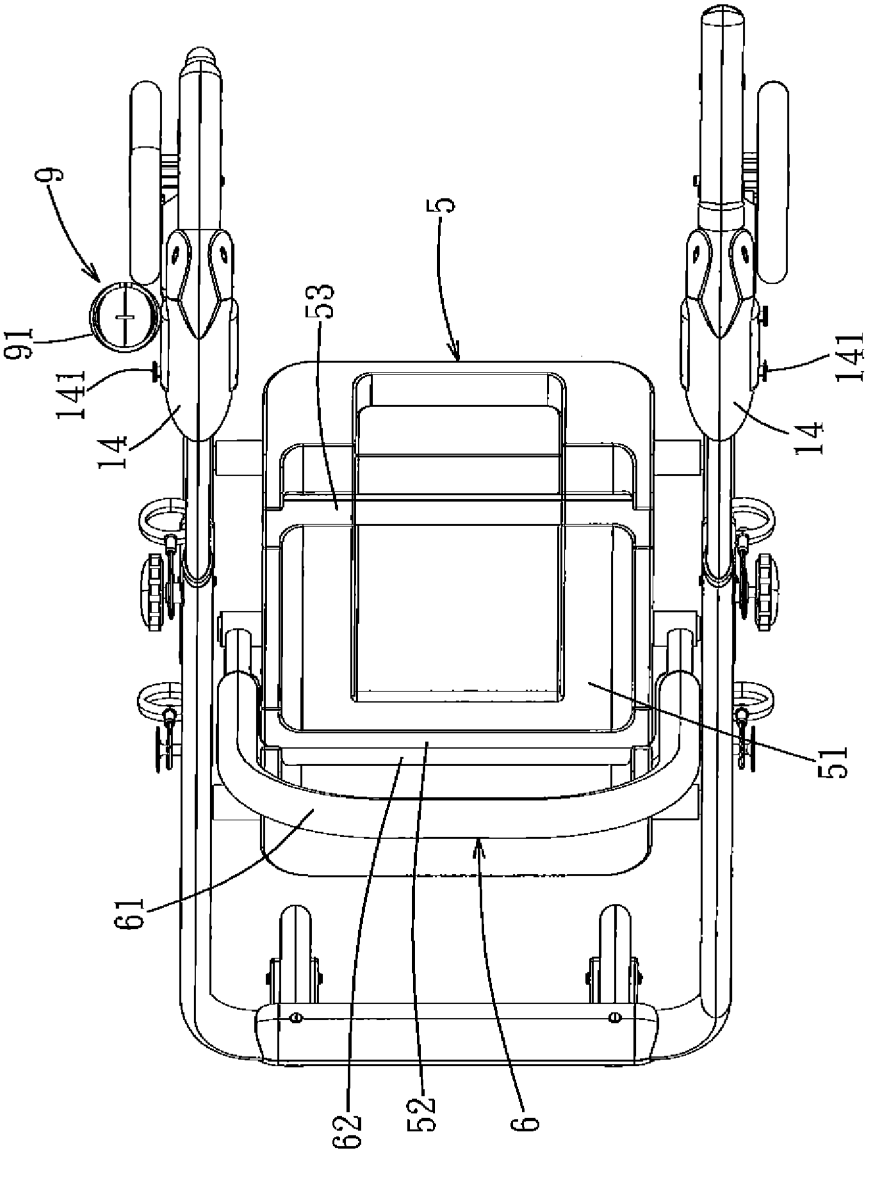
FIG. 3 is a schematic top view of the preferred embodiment, illustrating a seating space that faces rearward.

Referring to FIGS. 2 and 3, when the positioning frame 62 is moved to engage with the first positioning notch 52 of the seat 51, the backrest frame 61 is inclined forward and positioned thereat, and cooperates with the seat 51 to define a seating space that faces rearward for the user to sit. In this state, the user can grip the handgrips 13 to walk forward, or can stop walking to turn around and sit on the seat 51 and lean on the backrest frame 61 to rest.

Figure 4:
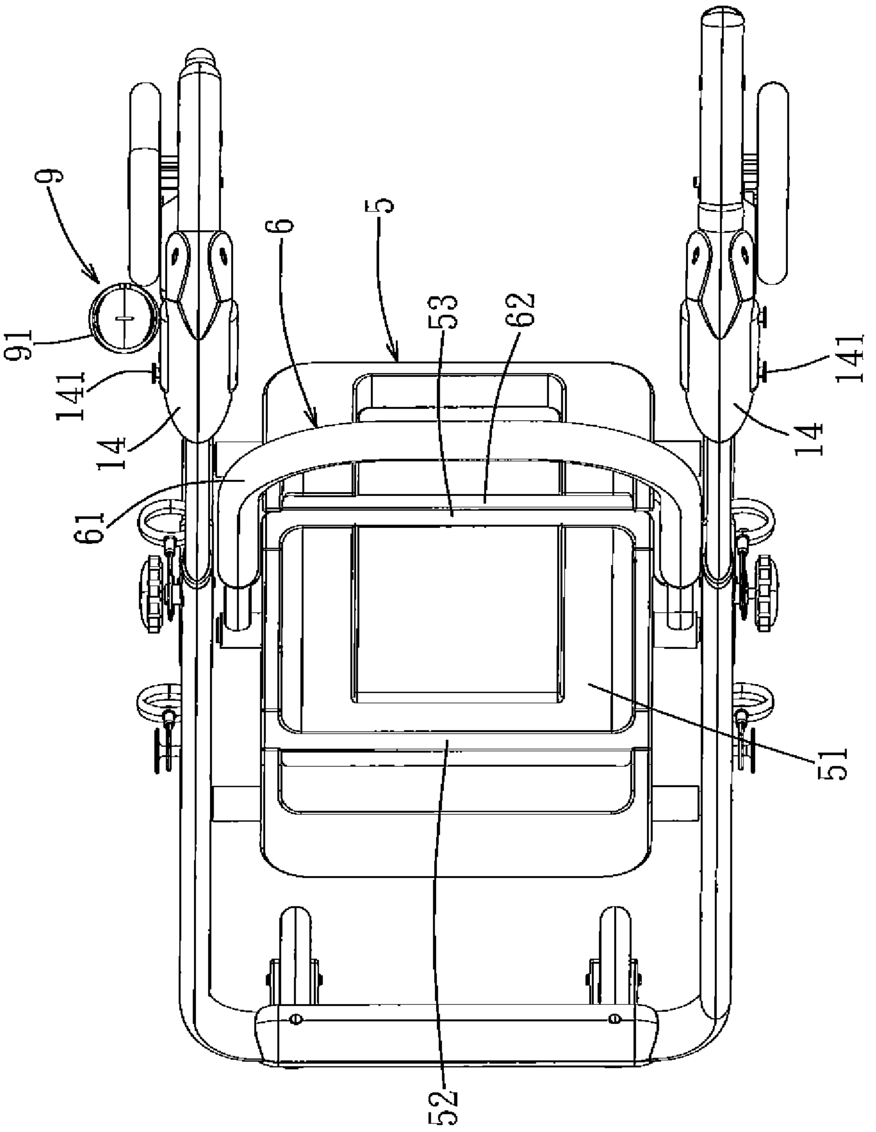
FIG. 4 is another schematic top view of the preferred embodiment, illustrating a seating space that faces forward.

Referring to FIG. 4, when the user desires to change his/her sitting orientation and use the rollator as a wheelchair, the backrest frame 61 is pulled to disengage the positioning frame 62 from the first positioning notch 52, and then the positioning frame 62 is pivoted rearward to engage the second positioning notch 53. In this state, the backrest frame 61 is inclined rearward and positioned thereat, and cooperates with the seat 51 to define a seating space that faces forward for the user to sit. At this moment, the user can sit on the seat 51 facing forward and lean on the backrest frame 61. Further, the user's feet can rest on the central bight portion 12 of the main support frame 1. Another person then holds the handgrips 13 to push the rollator, thereby simulating a wheelchair.

It is worth to mention that the rollator further comprises two umbrella support devices 8 respectively disposed at outer sides of the main support rods 11. Each umbrella support device 8 includes two hanging ring units 81 disposed spaced apart from each other on a corresponding one of the main support rods 11.

Figure 5:
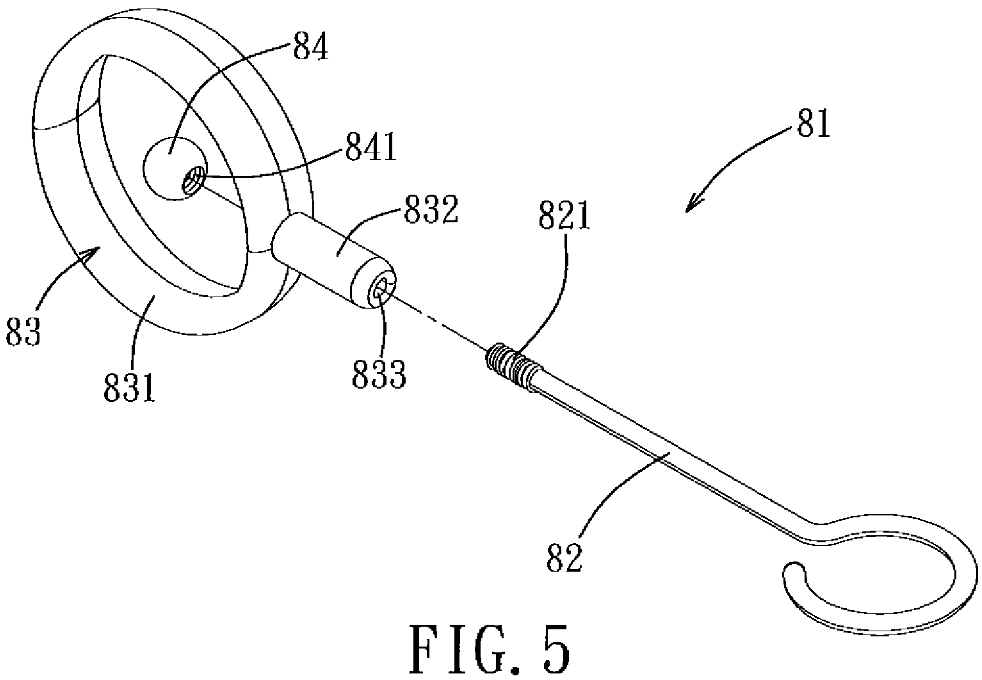
FIG. 5 is an exploded perspective view of a hanging ring unit of the preferred embodiment.

With reference to FIGS. 2 and 5, each of the hanging ring units 81 has a connecting rod 82 fixed to the corresponding main support rod 11, a hanging ring 83 rotatable 360 degrees relative to the connecting rod 82, and a limiting body 84. In this embodiment, the connecting rod 82 is a steel wire. The hanging ring 83 includes a ring body 831, a tubular body 832 extending radially from an outer surface of the ring body 831, and a passage hole 833 extending through the ring body 831 and the tubular body 832. The connecting rod 82 has one end configured as a hook end to hang fixedly to the corresponding main support rod 11, and the other end extending through the passage hole 833 and formed with an external thread 821. The limiting body 84 in this embodiment is configured as a ball, and has an outer diameter larger than an inner diameter of the passage hole 833. Moreover, the limiting body 84 has an internal thread 841 engaged to the external thread 821 of the connecting rod 82 to prevent the connecting rod 82 from escaping from the hanging ring 83. In this embodiment, the ring body 831 and the tubular body 832 of the hanging ring 83 are slightly resilient, and the passage hole 833 has a hole diameter slightly smaller than an outer diameter of the connecting rod 82. As such, the connecting rod extends through the passage hole 833 in a tight-fitting manner. Even though the hanging ring 83 can be rotated 360 degrees about the connecting rod 82, the connecting rod 82 cannot easily slide relative to the hanging ring 83.

To use the umbrella support device 8, the user may pivot the connecting rods 82 such that the connecting rods 82 are substantially parallel and form an angle with the main support rod 11, and then twist the hanging rings 83 such that the hanging rings 83 face the appropriate direction for placing an umbrella or cane through both hanging ring 83. In this embodiment, the ball-shaped limiting body 84 can prevent sharp portion of the connecting rods 82 from scratching the user's hand or the surface of the umbrella or the stick. To return the umbrella support device 8 to its resting state, the user may pivot the hanging rings 83 and the connecting rods 82 so that the entire hanging ring unit 81 is flush against the main support rod 11.

If the umbrella, cane, or other similar object is smaller in diameter than the hanging ring 83, the user may also push the connecting rod 82 through the hanging ring 83 further, whereby causing the limiting body 84 to near the side of the hanging ring 83 opposite the tubular body 832. This divides the hanging ring 83 into two compartments so that slimmer umbrellas, canes, and other similar objects can use one of the compartments instead of the entire ring to better secure them in the umbrella support device 8.

Figure 6:
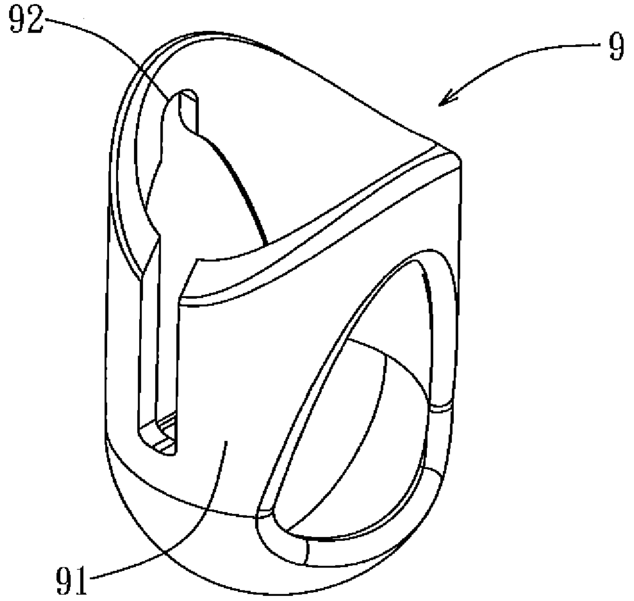
FIG. 6 is a perspective view of a cup holder of the preferred embodiment.

Referring to FIGS. 2 and 6, the rollator of the present invention further includes a detachable cup holder unit 9 to facilitate the user to set down his/her beverage while using the rollator. Each cover body 14 includes at least one positioning stud 141 projecting from an outer surface thereof. The cup holder 9 is hung removably to the positioning stud 141, and includes a cup holder body 91 defining an accommodation space for receiving a beverage, and a hanging portion 92 formed on the cup holder body 91. In this embodiment, the hanging portion 32 is a through opening that extends through one side of the cup holder body 31 and that has a size conforming with that of the positioning stud 141. As such, the cup holder 9 may be attached to either side of the rollator according to the user's requirement.

In sum, because the positioning frame 62 is engageable with a selected one of the first and second positioning notches 52, 53, the seating space defined by the seat 51 and the backrest frame 61 maybe altered according to the user's requirement. That is, the seating space may face rearward to allow the user to sit when he/she is tired, and may face forward to allow the user to sit while another person pushes the rollator to simulate a wheelchair. Hence, the object of this invention can be realized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A rollator, comprising:

a support frame assembly;

a plurality of spaced-apart wheels mounted on a bottom portion of said support frame assembly;

a seat unit including a seat that is mounted on said support frame assembly and that has a first positioning notch formed in a top surface thereof and proximate to a front end thereof, and a second positioning notch formed in said top surface and proximate to a rear end thereof; and a backrest unit including a backrest frame pivoted to said support frame assembly, and a positioning frame pivoted to said backrest frame, said positioning frame being engageable with a selected one of said first and second positioning notches, said backrest frame cooperating with said seat unit to define a seating space that faces rearward when said positioning frame is engaged with said first positioning notch, and cooperating with said seat unit to define a seating space that faces forward when said positioning frame is engaged with said second positioning notch, wherein said first positioning notch is inclined rearward relative to said top surface of said seat, and said second positioning notch is inclined forward relative to said top surface of said seat; and wherein said support frame assembly includes:

a main support frame including two spaced-apart main support rods, and two handgrips respectively connected to top ends of said main support rods;

a rear support frame including two rear support rods each pivoted to a respective one of said main support rods between top and bottom ends thereof; and an intermediate support frame mounted between said main support frame and said rear support frame, said wheels being mounted on bottom ends of said main support frame and said rear support rods, and said seat being mounted on said intermediate support frame.

2. The rollator as claimed in claim 1, wherein said first positioning notch is inclined rearward relative to said top surface of said seat at an angle of about 45° , and said second positioning notch is inclined forward relative to said top surface of said seat at an angle of about 45° .

3. The rollator as claimed in claim 1, wherein said seat further has a hatch.

4. The rollator as claimed in claim l, wherein said intermediate support frame includes a first frame part pivoted between said main support rods, and a second frame part pivoted between said rear support rods, said first and second frame parts and said backrest frame being pivoted to each other through a transverse axle.

5. The rollator as claimed in claim 4, wherein said first frame part includes a first support rod pivoted between said main support rods, and two spaced-apart second connection rods extending transversely from said first support rod, said second frame part including a second support rod pivoted between said rear support rods, and two spaced-apart second connection rods extending transversely from said second support rod, said transverse axle having two axle sections, a free end of each said first connection rod, a free end of each said second connection rod and a corresponding end of said backrest frame being pivoted to one of said axle sections of said transverse axle.

6. The rollator as claimed in claim 4, wherein said seat unit is fixed to one of said first and second frame parts.

7. The rollator as claimed in claim 1, wherein said main support frame is U-shaped, and includes a central bight portion connected between bottom ends of said main support rods, at least one of said wheels being mounted on said central bight portion.

8. The rollator as claimed in claim 1, wherein said positioning frame has a shallow U-shaped configuration with an upward opening and two opposite ends pivoted to said backrest frame, said backrest frame having a deep U-shaped configuration with a downward opening and two opposite ends pivoted to said intermediate support frame.

9. A rollator, comprising:

a support frame assembly;

a plurality of spaced-apart wheels mounted on a bottom portion of said support frame assembly;

a seat unit including a seat that is mounted on said support frame assembly and that has a first positioning notch formed in a top surface thereof and proximate to a front end thereof, and a second positioning notch formed in said top surface and proximate to a rear end thereof;

a backrest unit including a backrest frame pivoted to said support frame assembly, and a positioning frame pivoted to said backrest frame, said positioning frame being engageable with a selected one of said first and second positioning notches, said backrest frame cooperating with said seat unit to define a seating space that faces rearward when said positioning frame is engaged with said first positioning notch, and cooperating with said seat unit to define a seating space that faces forward when said positioning frame is engaged with said second positioning notch; and at least one umbrella support device that is disposed on an outer side of said support frame assembly, said umbrella support device including two spaced-apart hanging ring units, each of said hanging ring units including a connecting rod fixed to said main support frame, and a hanging ring rotatable 360 degrees relative to said connecting rod.

10. The rollator as claimed in claim 9, wherein said hanging ring includes a ring body, a tubular body extending radially from an outer surface of said ring body, and a passage hole extending through said ring body and said tubular body, said connecting rod having one end configured as a hook that is hooked to said main support frame, and the other end extending through said passage hole and formed with an external thread, each of said hanging ring units further including a limiting body having an outer diameter larger than an inner diameter of said passage hole, said limiting body having an internal thread to engage with said external thread of said connecting rod, said limiting body being fastened to one end of said connecting rod to prevent said connecting rod from escaping from said hanging ring.

11. The rollator as claimed in claim 10 wherein said passage hole has a hole diameter slightly smaller than an outer diameter of said connecting rod.

12. A rollator, comprising:

a support frame assembly;

a plurality of spaced-apart wheels mounted on a bottom portion of said support frame assembly;

a seat unit including a seat that is mounted on said support frame assembly and that has a first positioning notch formed in a top surface thereof and proximate to a front end thereof, and a second positioning notch formed in said top surface and proximate to a rear end thereof; and a backrest unit including a backrest frame pivoted to said support frame assembly, and a positioning frame pivoted to said backrest frame, said positioning frame being engageable with a selected one of said first and second positioning notches, said backrest frame cooperating with said seat unit to define a seating space that faces rearward when said positioning frame is engaged with said first positioning notch, and cooperating with said seat unit to define a seating space that faces forward when said positioning frame is engaged with said second positioning notch, wherein said support frame assembly includes a main support frame, said main support frame including two spaced-apart main support rods, two handgrips respectively connected to top ends of said main support rods, and two cover bodies each covering a pivot junction of one of said main support rods and a respective one of said handgrips, each of said cover bodies including at least one positioning stud projecting from an outer surface thereof, said rollator further comprising a cup holder that is hung removably on said positioning stud, said cup holder including a cup holder body defining an accommodation space for accommodating a container, and a hanging portion formed on said cup holder body.

13. The rollator as claimed in claim 12, wherein said hanging portion is configured as a through hole extending through one side of said cup holder body and having a size conforming with that of said positioning stud.

* * * * *